Nov. 1, 1949          H. H. JOHNSON          2,486,787
PISTON SLEEVE PROTECTION FOR BRAKE CYLINDERS
Filed April 8, 1946
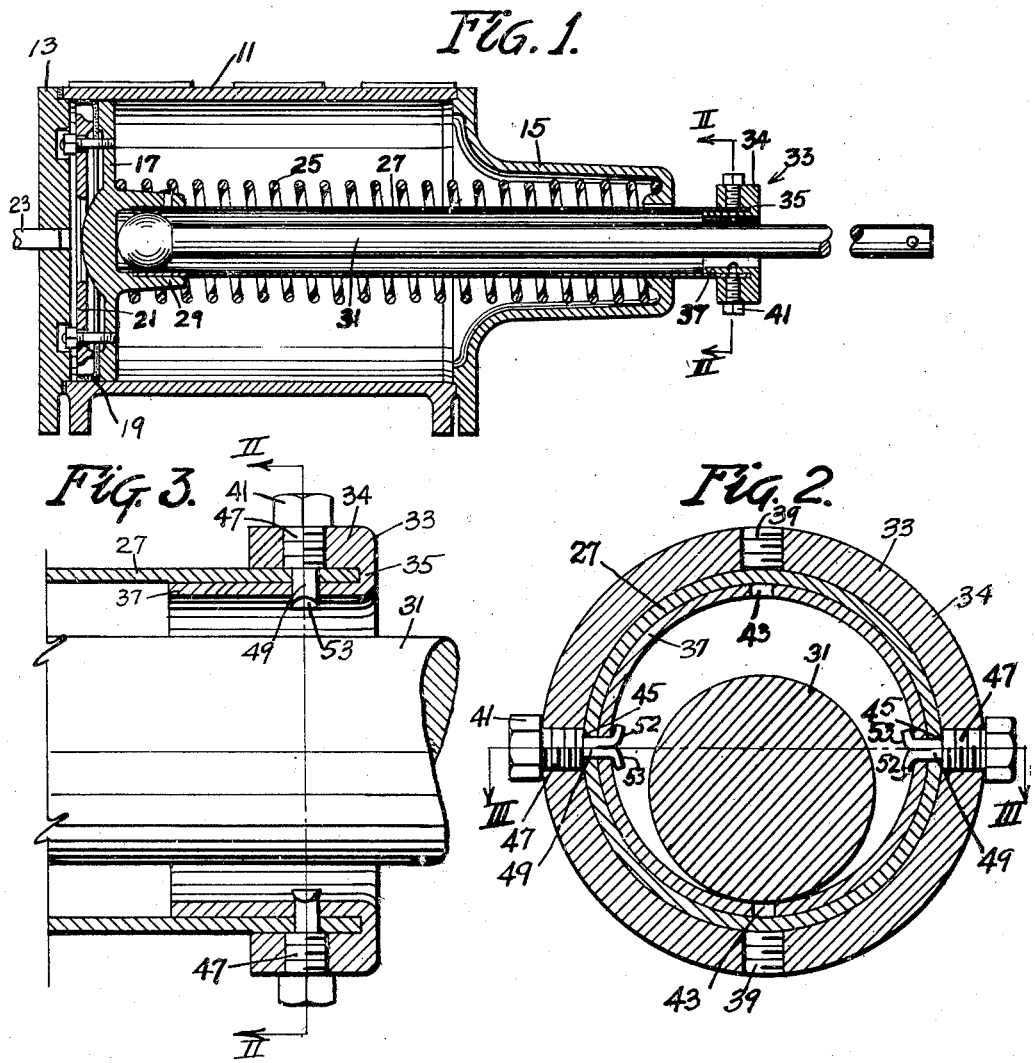
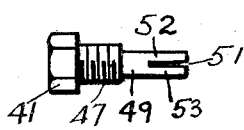
INVENTOR.
HERBERT H. JOHNSON
BY
J. H. Weatherford
atty.

Patented Nov. 1, 1949

2,486,787

UNITED STATES PATENT OFFICE 2,486,787

PISTON SLEEVE PROTECTION FOR BRAKE CYLINDERS

Herbert H. Johnson, Memphis, Tenn.

Application April 8, 1946, Serial No. 660,497

1 Claim. (Cl. 309—20)

This invention relates to brake cylinders such as employed with railway brake systems.

In usual practice, brake cylinder assemblies include the cylinder, having a pressure head, a non-pressure head, a hollow piston rod or sleeve and a push rod disposed within the hollow rod and projecting beyond it. This push rod is ordinarily substantially smaller in diameter than the hollow piston rod, with the result that the push rod normally bears on the lower part of the hollow piston rod adjacent its mouth. With use, the natural result has been wear and distortion of the hollow rod, impairing movement thereof and, therefore, impairing operation of the brake cylinder. Although the hollow rod is worn and distorted by the push rod about its inner periphery, the wear and distortion is substantially greater adjacent the portion of the hollow rod where the push rod bears thereon, and as a consequence such hollow rods must be frequently replaced, involving a considerable and difficult time-consuming task.

In usual practice, the hollow rod is made of bronze and frequent replacements is expensive. On occasions the worn portions are removed, shortening the hollow rod and thereby accentuating the probability of additional wear and distortion and the consequent impairment of operation. Protection for the hollow rod is clearly indicated, but prior efforts at such protection have proved inadequate in either increasing the difficulty of removal of the hollow rod or in sharply reducing the amount of clearance between the push rod and hollow rod to a dangerous minimum.

The principal object of the present invention, therefore, is to provide means for adequately protecting such hollow piston rods so as to prolong the life thereof, which means will be readily removable and inexpensive to replace and which will not substantially reduce the necessary clearance between the hollow rod and the push rod beyond reasonable limits.

A further object of the invention is to provide means for removably locking such protective means against accidental displacement.

The means by which the foregoing and other objects are accomplished, and the manner of their accomplishment, will be readily understood from the following specification upon reference to the accompanying drawings, in which:

Fig. 1 is a sectional plan view of a usual brake cylinder assembly with my improvements applied thereto.

Fig. 2 is an enlarged sectional view taken as on the line II—II of Figs. 1 and 3.

Fig. 3 is an enlarged fragmentary plan view taken as on the line III—III of Fig. 2; and Fig. 4 is an elevational view of a preferred form of bolt used in connection with the present improvements.

In the drawings, the illustrative assembly includes a brake cylinder 11, having a usual pressure head 13 at one end and a non-pressure head 15 at the opposite end. The cylinder is shown containing a usual brake cylinder piston 17 with cup packing ring 19 and follower 21. 23 is a pipe through which fluid under pressure is applied to and released from the pressure side of cylinder piston 17. As in usual practice a release spring 25 is interposed between piston 17 and the non-pressure head 15. A hollow piston rod or sleeve 27 is secured in a hollow boss 29 carried by piston 17 and projects beyond the non-pressure head 15, and a push rod 31 is disposed, in usual manner, within the hollow piston rod, the push rod being substantially longer than the hollow rod.

In accordance with the present invention, the hollow rod 27 is protected from the push rod 31 by securing protective unit 33 to the projecting end of the hollow rod. Unit 33 has an external collar portion 34, adapted to fit the outside of a hollow rod 27, is inwardly flanged as at 35, and has an inner sleeve extension 37 which is adapted to fit within the hollow piston rod 27. Collar portion 34 is tapped with suitable outer holes 39, preferably four in number, which extend therethrough and are threaded to receive screws or bolts 41. Preferably unit 33 is secured in position by two bolts 41 threaded into holes 39, spaced 180 degrees apart and collar portion 34 is additionally tapped at 90 degrees from each hole 39 to permit shifting of collar 33 after wear conditions thereon have been set up. The sleeve extension 37 of the unit is apertured with inner holes 43 therethrough, each hole 39 of collar portion 34 having a hole 43 concentrically alined therewith. Preferably holes 43 are of a diameter smaller than that of holes 39, as illustrated, the desirability of which will be hereinafter pointed out.

Hollow piston rod 27 is apertured with a pair of holes as at 45, spaced 180 degrees apart in the normally horizontal plane of the piston rod. Holes 45 are spaced away from the end of piston rod 27 so as to register with outer holes 39 and inner holes 43 when the unit 33 is applied to the piston rod.

Preferably bolts 41 have a threaded portion 47, the length of which preferably does not exceed the thickness of collar portion 34, and an unthreaded portion 49. Unthreaded portion 49 is preferably slotted by a slot 51, forming tongues 52, 53. The diameter of the unthreaded portion is preferably less than that of threaded portion 49 and the smaller diameter of holes 43 is provided to receive and snugly fit such unthreaded portion.

In construction, hollow piston rod 27 is apertured with holes 45, spaced 180 degrees apart, and the brake cylinder assembly is made up in usual fashion, the hollow piston rod being positioned with holes 45 in the normal horizontal plane thereof. Unit 33 is slipped over the end of the hollow rod 27, collar portion 34 closely fitting the exterior of the hollow rod, sleeve portion 37 closely fitting the interior thereof, and the interior of flange portion 35 abutting the end of the hollow rod. Holes 39, 43 of unit 33 are registered with rod holes 45, and bolts 41 are screwed thereinto. In using the preferred form of bolt the unthreaded portion 49 extends into and through holes 43, 45, the tongues 52, 53 being thereby projected into the interior of hollow rod 27. The tongues are then separated and forced into position substantially flush with the interior of the hollow rod. In this manner the bolts 41 may be locked in position against the possibility of accidental removal. It will, however, be noted that bolts 41 of the preferred form may be readily removed by unscrewing, the formation of the tongues 52, 53 being such that they will compress when drawn back by the unscrewing movement.

It will be understood that while the form of bolt is described for securing my protective means to a brake cylinder assembly, it has many other uses which are within the scope of my invention. Further, while its use is preferable in securing my protective means to a brake cylinder assembly, other means of securing such protective means may be employed without departing from my improvement in such protective means.

It will readily be seen that the protective unit herein described is provided to relieve the hollow piston rod of wear at the very point of maximum damage, and the unit may be quickly and easily removed by unscrewing bolts 41 and withdrawing the unit from the end of the hollow piston rod, without necessitating the removal of the piston rod. In addition, when wear has set in on one position of unit 33, the bolts may be removed, and the unit rotated 90 or 180 degrees as desired to bring a new and unworn surface to the point of maximum wear.

I claim:

In a device which includes a hollow piston rod, and a push rod loosely disposed within and supported at its outer end by said piston rod, and projecting therebeyond; rotatably shiftable means for preventing damage to said piston rod by said push rod and removable means securing said damage preventing means to said piston rod against displacement and shift; said damage preventing means comprising an integral unit having an annular inner wall, an annular outer wall and a flange therebetween, the end of said piston rod being nested between said walls and abutting said flange portion, and having a pair of diametrically alined apertures through opposite sides thereof, and the walls of said damage preventing means having a plurality of sets of complementary diametrically alined apertures, any one of which sets is optionally rotatably shiftable into alinement with said piston apertures, bolts engaging said apertures, said piston rod apertures being horizontally disposed to position said locking means away from the supported portion of said piston rod.

HERBERT H. JOHNSON.

REFERENCES CITED

The following references are of record in the file of this patent:

UNITED STATES PATENTS

| Number | Name | Date |
| --- | --- | --- |
| 719,559 | Brown | Feb. 3, 1903 |
| 980,823 | Nicols | Jan. 3, 1911 |
| 1,626,596 | Campbell | May 3, 1927 |
| 1,745,346 | Anderson | Feb. 4, 1930 |
| 2,204,795 | Farmer | June 18, 1940 |
| 2,337,766 | Newell | Dec. 28, 1943 |

FOREIGN PATENTS

| Number | Country | Date |
| --- | --- | --- |
| 206,275 | England | Nov. 8, 1923 |